United States Patent [19]
Köhler et al.

[11] 4,128,534
[45] Dec. 5, 1978

[54] PROCESS FOR THE PRODUCTION OF HIGH MOLECULAR WEIGHT POLYESTERS

[75] Inventors: Armin Köhler; Herbert Pelousek, both of Dormagen; Helmut Ohse, Zons; Hans Westermann; Karl-Heinz Magosch, both of Marl, all of Germany

[73] Assignees: Bayer Aktiengesellschaft, Leverkusen; Faserwerke Hüls Gesellschaft mit beschränkter Haftung, Marl, both of Germany

[21] Appl. No.: 825,422

[22] Filed: Aug. 17, 1977

[30] Foreign Application Priority Data
Aug. 21, 1976 [DE] Fed. Rep. of Germany ....... 2637814

[51] Int. Cl.² ............................................ C08G 63/14

[52] U.S. Cl. .................................. 528/279; 528/272; 528/308

[58] Field of Search ...................... 260/75 R

[56] References Cited
U.S. PATENT DOCUMENTS

| | | | |
|---|---|---|---|
| 3,660,358 | 5/1972 | Hrach et al. | 260/75 R |
| 3,907,754 | 9/1975 | Tershansy et al. | 260/75 R |
| 3,962,189 | 6/1976 | Russin et al. | 260/75 R |
| 4,010,145 | 3/1977 | Russin et al. | 260/75 R |

*Primary Examiner*—Lucille M. Phynes
*Attorney, Agent, or Firm*—Plumley and Tyner

[57] ABSTRACT

This invention relates to a process for the production of a high molecular weight polyester by reacting a dicarboxylic acid or a derivative thereof with a diol in the presence of a catalyst comprising a combination of compounds of manganese, magnesium and titanium.

8 Claims, No Drawings

PROCESS FOR THE PRODUCTION OF HIGH MOLECULAR WEIGHT POLYESTERS

This invention relates to a process for the production of high molecular weight polyesters using a certain catalyst combination.

It is known that high molecular weight fibre-forming polyesters can be produced from dicarboxylic acids and diols. The most well known representative of this class of polyesters is polyethylene terephthalate. Production may be carried out either by directly esterifying the dicarboxylic acid with the glycol or by transesterifying a dicarboxylic acid ester with the glycol, followed in each case by polycondensation. The most well known processes of this type for the production of polyethylene terephthalate are the direct esterification of terephthalic acid with ethylene glycol and the transesterification of dimethyl terephthalate with ethylene glycol. It is possible to use esterification, transesterification and polycondensation catalysts in these processes. A whole number of catalysts such as these are described in the literature (cf. H. Ludewig, "Polyesterfasern" (Polyester Fibres), Akademieverlag Berlin (1975), pages 104 and 113 to 121).

Nevertheless, there is a considerable need to find new catalysts for the production of high molecular weight polyesters which shorten the reaction times of the processes carried out with the conventional catalysts and hence lead to lighter, substantially colourless products and/or enable products of higher molecular weight to be obtained. Accordingly, it was an object of the present invention to provide a catalyst system by which it is possible, in the production of high molecular weight polyesters, to reach the necessary molecular weights. It was a further object of the present invention to provide a catalyst by the aid of which a substantially colourless product can be obtained. Still another object of the invention was to provide a catalyst by which the polyester production can be achieved in shorter reaction times.

A special object simultaneously of the invention was it to provide a catalyst system by which it is possible to reach the necessary molecular weights to obtain a substantially colourless product and to shorten the reaction time.

Other objects will be evident from the following description and the Examples.

These objects are accomplished by using a catalyst combination of a manganese compound, a magnesium compound and a titanium compound in the production of high molecular weight polyesters.

Accordingly, the present invention provides a process for the production of a high molecular weight polyester by reacting a dicarboxylic acid or a derivative thereof with a diol in the presence of a catalyst comprising a combination of compounds of manganese, magnesium ad titanium.

This catalyst combination is suitable both for the direct esterification process and for the transesterification process, there being no need to add a separate polycondensation catalyst. The catalyst combination according to the invention is preferably used in the transesterification/polycondensation process.

Suitable catalyst components are any compounds of the metals manganese, magnesium and titanium which can be effectively dispersed in the reaction medium and are as soluble as possible therein. Manganese acetate, magnesium acetate and isopropyl titanate in particular have proved to be excellent representatives of this class.

The catalyst components are used in such a quantity that the initial reaction mixture contains from 2 to 120 ppm and preferably from 50 to 70 ppm of manganese, from 2 to 120 ppm and preferably from 4 to 12 ppm of magnesium and from 0.5 to 50 ppm and preferably from 1 to 10 ppm of titanium, expressed in each case as metal. The ppm figures are based in each case on the quantity of dicarboxylic acid present in the reaction mixture, expressed as dimethyl carboxylate.

Both the direct esterification process and also the transesterification process, followed in each case by polycondensation, are sufficiently well known so that there is no need for them to be discussed in detail here. In this connection, reference is made in particular to H. Ludewig, "polyesterfasern" (Polyester Fibres), Akademieverlag Berlin (1975), pages 95 to 175. Both batch-type processes and continuous processes are suitable for the present invention.

The catalyst system according to the invention may be used for the production of any high molecular weight polyesters which are suitable for the production of filaments and fibres and also injection-moulded articles. Polyesters of this type are, in particular, the polyesters of terephthalic acid, but also polyesters of isophthalic acid and 1,4-cyclohexane dicarboxylic acid, and, in some cases, also polyesters of aliphatic dicarboxylic acids, such as adipic acid and sebacic acid. The diol component of the polyester may be any of the glycols suitable for polyesters of the type in question, especially ethylene glycol, 1,4-butane diol and 1,4-cyclohexane dimethanol.

Under high molecular weight polyesters are to understand such polyesters having a relative solution viscosity of e.g. from 1,090 to 1,230 (0,23% by weight solution in 60 parts by weight of phenol and 40 parts by weight of tetrachloroethane at 25° C), especially in the case of a polyester prepared from dimethyl terephthalate and ethylene glycol.

The use of compounds of manganese, magnesium and titanium either individually or in combinations with other compounds was already known per se in the production of polyesters.

However, the catalyst system according to the invention has in particular the following advantages:

The formation of polymanganese glycolate, which cannot be avoided where manganese is used without the addition of magnesium and which, in a continuously operated reactor for example, leads to deposits and coarse crosslinked particles, is largely avoided. Accordingly, the reactor need be cleaned less often and the filters are not blocked as quickly during the spinning process.

In batch-type operation, the polycondensation temperature is 275° C, i.e. relatively low, in cases where the catalyst combination according to the invention is used. This means that, in continuous operation, the spinning temperature (in the case of direct spinning) can be freely selected from this temperature upwards, whereas in the case of known catalysts, which are only active at elevated temperatures, relatively low spinning temperatures are only possible with considerable technical outlay. The low polycondensation temperature of 275° C has the further advantage that, in cases where it may be desired to utilise the reactor capacity to a greater extent in continuous operation, the polycondensation temperature may be further increased by 20° C to 295° C, giving an increase in throughput of from 30 to 35%. Other catalysts, which have to be operated from the outset at temperatures of the order of 290° C, do not provide for the increase in temperature and, hence, throughput. Another advantage of this low polycondensation temperature of 275° C is that the polyester granulate obtained is very light in colour (as measured by remission) and, in addition, still contains a small number of carboxyl groups.

The catalyst combination according to the invention shows a markedly synergistic effect. If, for example, $x$ molar quantity of manganese and a certain quantity of titanium are used as transesterification and polycondensation catalysts and if the polyester obtained is spun, it has a certain relative solution viscosity. However, a granulate with the same relative solution viscosity is also obtained when a $y$ molar quantity of magnesium and, once again, a certain quantity of titanium are used as catalyst. If, however, a $x/2$ molar quantity of manganese and $y/2$ molar quantity of magnesium and the certain quantity of titanium are used as catalysts, the granulate obtained has a higher relative solution viscosity than that obtained when combinations of magnesium/titanium or manganese/titanium are separately used. In addition, the number of terminal carboxyl groups still present in the polyester is further reduced. The number of termina carboxyl groups is determined by a method known from the literature (H. Ludewig "Polyesterfasern" (Polyester Fibres), Akademie-Verlag Berlin, 1975, page 188) and is expressed in val/$t$ in the following Examples.

The relative solution viscosity is a measure of the molecular weight of the polyester formed. According to the present invention, the relative solution viscosity is the ratio of the viscosity of a 0.23% solution of polyester in 60 parts by weight of phenol and 40 parts by weight of tetrachloroethane to the viscosity of the pure solvent mixture, as measured in the same units at a temperature of 25° C.

The following Examples are to further illustrate the invention without limiting it:

EXAMPLE 1

80 kg of dimethyl terephthalate (DMT) and 77 kg of ethylene glycol (molar ratio 1:3) were introduced into an autoclave. 8 ppm of magnesium (5.64 Mg-acetate . 4 H$_2$O), 60 ppm of manganese (22.3 g of Mn-acetate . 4 H$_2$O) and 5 ppm of titanium (2.4 g of isopropyl titanate) were added as catalyst. Transesterification was carried out over a period of 3 hours at 200° C under normal pressure. Precondensation was carried out over a period of 0.5 hour at a temperature of 220° C. Polycondensation was subsequently carried out over a period of 2.5 hours at 275° C under a pressure of <1 Torr, followed by spinning and granulation.

72 kg of polyethylene terephthalate with the following properties were obtained:
Melting point 256° C
Relative viscosity 1.163
Number of terminal carboxyl groups 23 val/$t$.

The granulate can be processed without difficulty into filaments and fibres.

EXAMPLE 2

In a continuous polycondensation apparatus, DMT and ethylene glycol were delivered to a reactor in a ratio of 1:2.8. 65 ppm of manganese in the form of Mn-acetate . 4 H$_2$O, 9 ppm of magnesium in the form of Mg-acetate. 4 H$_2$O and 4 ppm of titanium in the form of isopropyl titanate were added as catalyst. Transesterification was carried out at 200° C. In the next reactor, precondensation was carried out at 220° C/100 Torr and, in the last reactor, polycondensation was carried out at 275° C 1 Torr. The melt may either be granulated or may be directly delivered to a spinning apparatus.

The granulate has the following properties:
Melting point 256° C
Relative viscosity 1.158
Number of terminal carboxyl groups 25 val/$t$.

The apparatus has an output of approximately 1800 kg per hour at a polycondensation temperature of 275° C. If the polycondensation temperature is increased from 275° C to 295° C, the output can be increased to 2400 kg per hour . The granulate produced in this way has the following properties:
Melting point 256° C
Relative viscosity 1.157
Number of terminal carboxyl groups 26 val/$t$.

EXAMPLE 3

(a) 97 g of DMT and 93 g of ethylene glycol were introduced into a glass autoclave. 60 ppm of manganese in the form of manganese acetate. 4 H$_2$O and 9 ppm of titanium in the form of isopropyl titanate) were added as catalyst. Transesterification is carried out over a period of 3 hours at 200° C. The temperature was then increased to 220° C, followed by precondensation for 30 min. Polycondensation took place over a period of 2 hours at 275° C/ <1 Torr. The product was spun and granulated. The polyethylene terephthalate obtained had the following properties:
Melting point 256° C
Relative viscosity 1.161
Number of terminal carboxyl groups 26 val/$t$.

(b) The procedure and conditions were the same as in a), except that the catalysts used were as follows: 10 ppm of magnesium in the form of Mg-acetate. 4 H$_2$O 9 ppm of titanium in the form of isopropyl titanate.

The granulate obtained had the following properties:
Melting point 256° C
Relative viscosity 1.160
Number of terminal carboxyl groups 25 val/$t$.

(c) The procedure and conditions were the same as in a), except that the catalyst used was as follows:
30 ppm of manganese in the form of Mn-acetate. 4 H$_2$O
5 ppm of magnesium in the form of Mg-acetate. 4 H$_2$O
9 ppm of titanium in the form of isopropyl titanate.
The granulate obtained had the following properties:
Melting point 256° C
Relative viscosity 1.167
Number of terminal carboxyl groups 20 val/$t$.

Although only half the quantity of manganese from test (a) and half the quantity of magnesium from test $b$) were used, so that about the same relative viscosity as in these two tests could be expected, a high molecular weight was reached in test (c). In addition, the number of terminal carboxyl groups was improved in relation to tests (a) and (b). Both effects are attributable to the synergistic effect of the manganese/magnesium/titanium catalyst system.

What is claimed is:

1. A process for the production of a high molecular weight polyester by reacting a dicarboxylic acid or a derivative thereof with a diol in the presence of a catalyst comprising a combination of compounds of manganese, magnesium and titanium.

2. The process of claim 1, wherein said manganese compound is manganese acetate.

3. The process of claim 1, wherein said magnesium compound is magnesium acetate.

4. The process of claim 1, wherein said titanium compound is isopropyl titanate.

5. The process of claim 1, wherein said catalyst consists of manganese acetate, magnesium acetate and isopropyl titanate.

6. The process of claim 1, wherein said compounds of said catalyst are present in quantities such that, at the beginning of the reaction, the reaction mixture contains from 2 to 120 ppm of manganese, from 2 to 120 ppm of magnesium and from 1 to 10 ppm of titanium (all expressed as metals), based in each case on the quantity of said dicarboxylic acid or said derivative thereof.

7. The process of claim 6, wherein the quantities are from 50 to 70 ppm of manganese, from 4 to 12 ppm of magnesium and from 1 to 10 ppm of titanium.

8. A high molecular weight polyester when produced by a process as claimed in claim 1.

* * * * *